(12) United States Patent
Miyake

(10) Patent No.: US 9,379,386 B2
(45) Date of Patent: Jun. 28, 2016

(54) ELECTRODE BODY

(71) Applicant: Hideaki Miyake, Susono (JP)

(72) Inventor: Hideaki Miyake, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 72 days.

(21) Appl. No.: 14/243,654

(22) Filed: Apr. 2, 2014

(65) Prior Publication Data
US 2014/0302390 A1 Oct. 9, 2014

(30) Foreign Application Priority Data

Apr. 5, 2013 (JP) ................. 2013-079576

(51) Int. Cl.
H01M 4/02 (2006.01)
H01M 4/13 (2010.01)
H01M 4/64 (2006.01)
H01M 10/04 (2006.01)
H01M 10/052 (2010.01)
H01M 10/0562 (2010.01)
H01M 10/0585 (2010.01)

(52) U.S. Cl.
CPC ........... *H01M 4/64* (2013.01); *H01M 4/13* (2013.01); *H01M 10/0463* (2013.01); *H01M 10/052* (2013.01); *H01M 10/0562* (2013.01); *H01M 10/0585* (2013.01); *Y02E 60/122* (2013.01)

(58) Field of Classification Search
None
See application file for complete search history.

(56) References Cited

U.S. PATENT DOCUMENTS 6,576,371 B1 * 6/2003 Yasuda .............. C08G 79/025
429/309
2012/0070715 A1 * 3/2012 Obika ............... H01M 10/0585
429/152

FOREIGN PATENT DOCUMENTS

JP 2009-224173 A 10/2009
JP 2012-038425 A 2/2012

OTHER PUBLICATIONS

Ikuta et al., Battery, JP2009-224173 (English translation), Oct. 1, 2009.*

* cited by examiner

*Primary Examiner* — Patrick Ryan
*Assistant Examiner* — Jose Colucci Rios
(74) *Attorney, Agent, or Firm* — Dinsmore & Shohl LLP

(57) ABSTRACT

An electrode body includes a laminated body and an insulating fixing member. The laminated body includes a positive-electrode active material layer, a negative-electrode active material layer, a negative-electrode current collector layer, and a solid electrolyte layer. The negative-electrode current collector layer includes a current-collector extension portion that extends outward further than the negative-electrode active material layer. The solid electrolyte layer includes an electrolyte extension portion that integrally covers an end surface of the negative-electrode active material layer and a base end portion of the current-collector extension portion. The insulating fixing member covers at least front and back surfaces of a distal end portion exposed from the second electrolyte extension portion.

3 Claims, 4 Drawing Sheets

ELECTRODE BODY

INCORPORATION BY REFERENCE

The disclosure of Japanese Patent Application No. 2013-079576 filed on Apr. 5, 2013 including the specification, drawings and abstract is incorporated herein by reference in its entirety.

BACKGROUND OF THE INVENTION

1. Field of the Invention

The present invention relates to an electrode body, in particular, to an electrode body that includes a positive electrode layer, a negative electrode layer, and a solid electrolyte layer formed between the positive electrode layer and the negative electrode layer.

2. Description of Related Art

Nowadays, an electrode body that includes a positive-electrode mixture layer, a negative-electrode mixture layer, a solid electrolyte layer formed between the positive-electrode mixture layer and the negative-electrode mixture layer has been proposed. Batteries with this type of electrode body include an all-solid-state battery.

Japanese Patent Application Publication No. 2012-38425 (JP 2012-38425 A) discloses a structure related to an electrode body that includes a solid electrolyte layer, a current collector, and an active material layer sandwiched between the solid electrolyte layer and the current collector. In the electrode body described in JP 2012-38425 A, an insulating material integrally covers a part of an end surface of the active material layer and the peripheral edge portion of a surface facing the solid electrolyte layer in the active material layer. In this state, the active material layer and the solid electrolyte layer are laminated together. Thus, the active material layer and the solid electrolyte layer are laminated together in the state covered with the insulating material. This prevents deformation and dropping-off of the end portion of the active material to prevent occurrence of short circuit in association with the deformation and the dropping-off of the active material.

Incidentally, in the electrode body as described above, it is necessary to position the layers for providing sufficient performance as a battery. However, in the electrode body with the structure as described above, the active material layer and the solid electrolyte layer are laminated together in a state where the insulating material covers the peripheral edge portion of the facing surface. Accordingly, in the above-described peripheral edge portion, the insulating material is sandwiched between the active material layer and the solid electrolyte layer. In portions other than the above-described peripheral edge portion, the insulating material is not sandwiched. Therefore, the above-described peripheral edge portion becomes thicker compared with the other portions as the number of lamination is increased.

SUMMARY OF THE INVENTION

An object of the present invention is to provide an electrode body that allows positioning while suppressing increase in thickness.

An electrode body according to a first aspect of the present invention includes a laminated body and an insulating fixing member. The laminated body includes a positive electrode layer, a negative electrode layer, a positive-electrode current collector layer, a negative-electrode current collector layer, and a solid electrolyte layer. The positive-electrode current collector layer or the negative-electrode current collector layer includes a current-collector extension portion that extends outward further than the positive electrode layer or the negative electrode layer. The solid electrolyte layer includes an electrolyte extension portion that integrally covers an end surface of the positive electrode layer or the negative electrode layer and a base end portion of the current-collector extension portion. The insulating fixing member covers at least front and back surfaces of a distal end portion of the current-collector extension portion. The distal end portion is exposed from the electrolyte extension portion.

This electrode body includes the electrolyte extension portion, the current-collector extension portion, and the fixing member. In the electrolyte extension portion, the solid electrolyte layer covers the end surface of the positive electrode layer or the negative electrode layer and the base end portion of the current-collector extension portion. In the current-collector extension portion, the positive-electrode current collector layer or the negative-electrode current collector layer extends outward further than the positive electrode layer or the negative electrode layer. Further, the fixing member covers at least front and back surfaces of the distal end portion exposed from the electrolyte extension portion in the current-collector extension portion. Thus, the electrolyte extension portion is covered with the fixing member so as to form the laminated structure. The electrolyte extension portion is fixed outside of the layer (in the portion that is not sandwiched by the positive electrode layer and the negative electrode layer). This allows positioning while suppressing the increase in thickness.

The fixing member may cover an overall distal end portion of the current-collector extension portion. In this case, the overall distal end portion exposed from the electrolyte extension portion in the current-collector extension portion is covered with the insulating fixing member. This can achieve a high fixing force in the fixing member.

The first aspect of the present invention allows positioning while suppressing the increase in thickness.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
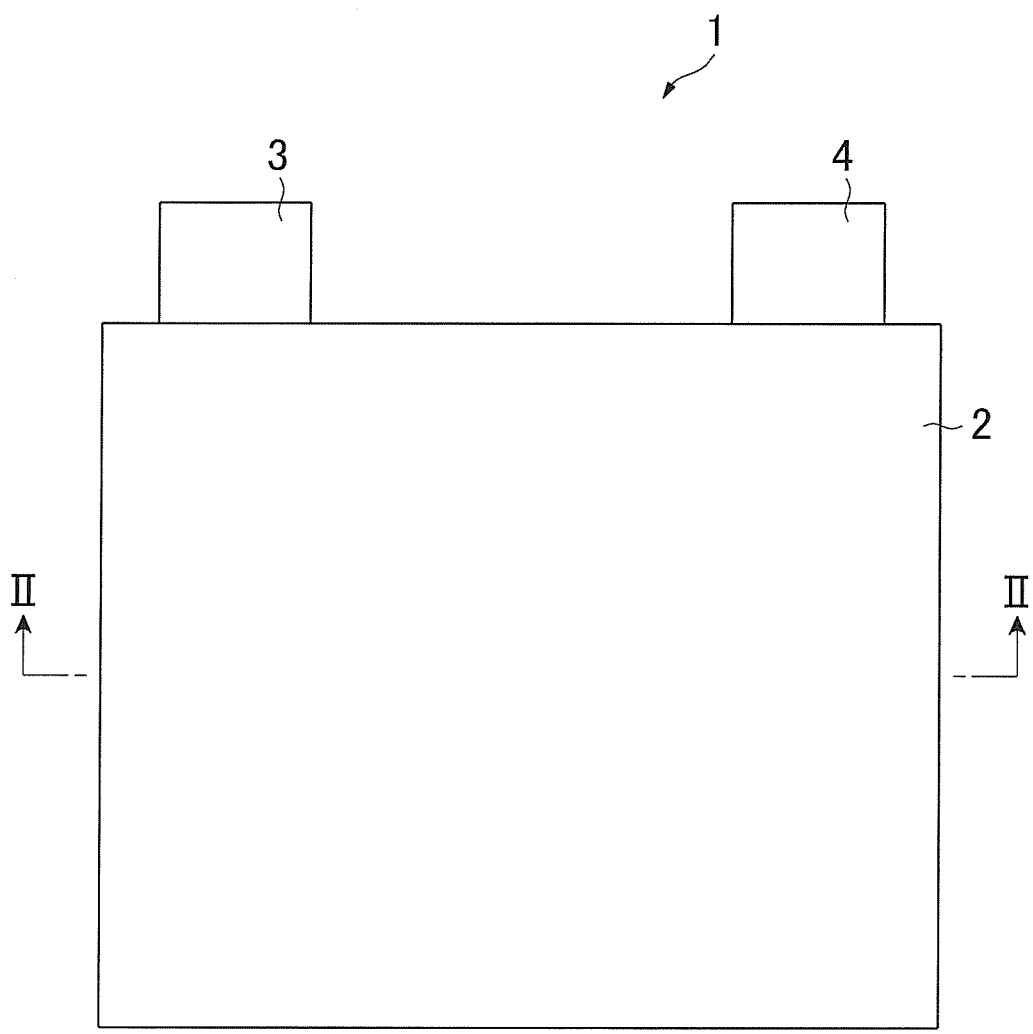
FIG. 1 is a side view illustrating an electrode body according to the embodiment.

Embodiments of the present invention will be described below by referring to the accompanying drawings. In this embodiment, the electrode body according to the present invention will be described, illustrating an exemplary all-solid-state battery. Like reference numerals designate corresponding or identical elements, and therefore such elements will not be further elaborated here.

Figure 2:
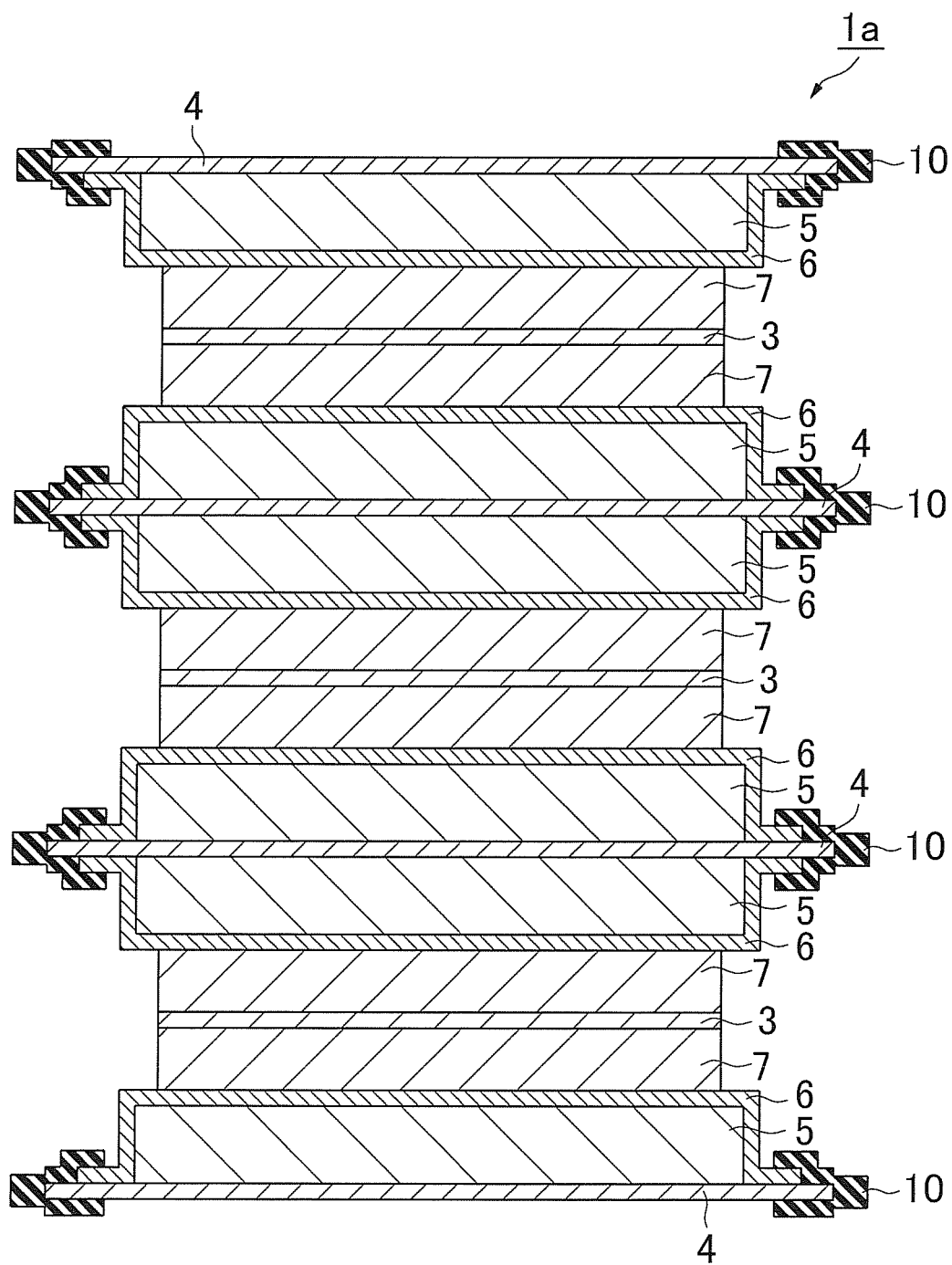
FIG. 2 is a cross-sectional view taken along the line II-II in the electrode body of FIG. 1.

As illustrated in FIG. 1 and FIG. 2, an electrode body 1 is an all-solid-state battery in which a laminated body 1a of electrodes is enclosed within an exterior member 2 that is constituted of an aluminum laminated film and similar member. The laminated body 1a includes a positive-electrode current collector layer 3, a negative-electrode current collector layer 4, a negative-electrode active material layer (a negative electrode layer) 5, a solid electrolyte layer 6, and a positive-electrode active material layer (a positive electrode layer) 7. The lamination order of the laminated body 1a of the electrode body 1 is as follows: the negative-electrode current collector layer 4, the negative-electrode active material layer 5, the solid electrolyte layer 6, the positive-electrode active material layer 7, the positive-electrode current collector layer 3, the positive-electrode active material layer 7, the solid electrolyte layer 6, and the negative-electrode active material layer 5. In this order, the respective layers are repetitively laminated together within the exterior member 2.

As illustrated in FIG. 1, the positive-electrode current collector layer 3 and the negative-electrode current collector layer 4 project to the outside of the exterior member 2. The respective layers function as a positive electrode terminal and a negative electrode terminal. The positive-electrode current collector layer 3 can employ, for example, aluminum. The negative-electrode current collector layer 4 can employ, for example, copper.

As illustrated in FIG. 2, on both sides of the negative-electrode current collector layer 4, the negative-electrode active material layers 5 are arranged. On both sides of the positive-electrode current collector layer 3, the positive-electrode active material layers 7 are arranged. In the respective negative-electrode active material layer 5 and positive-electrode active material layer 7, oxidation-reduction reactions that emit and receive electrons are performed. The solid electrolyte layer 6 is arranged between the negative-electrode active material layer 5 and the positive-electrode active material layer 7. The solid electrolyte layer 6 has a function that causes metal ions such as lithium ions to flow between the positive-electrode active material layer 7 and the negative-electrode active material layer 5. Additionally, the positive-electrode current collector layer 3, the negative-electrode current collector layer 4, the negative-electrode active material layer 5, the solid electrolyte layer 6, and the positive-electrode active material layer 7 extend over the entire region of a surface perpendicular to a lamination direction of the respective layers of the electrode body 1 (hereinafter referred to simply as the lamination direction).

Figure 3:
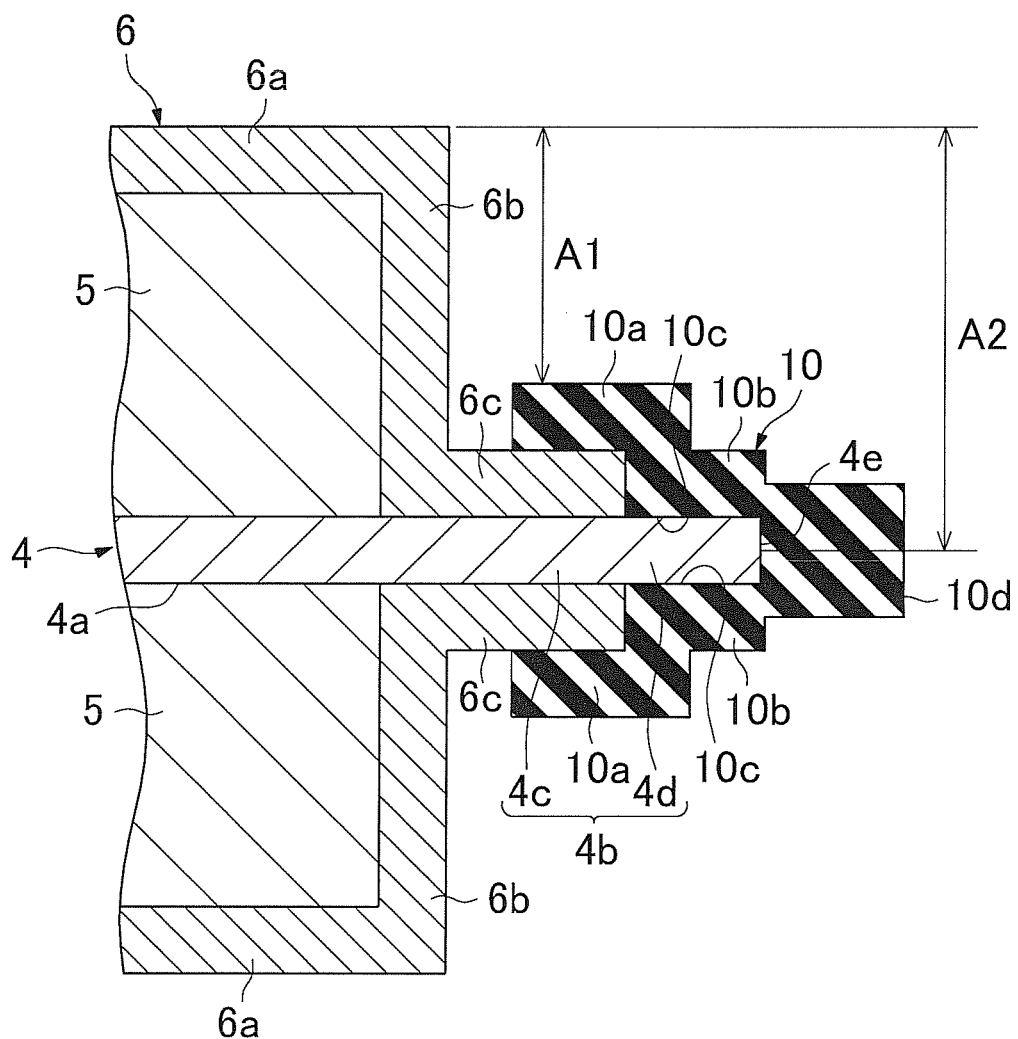
FIG. 3 is an enlarged view of the vicinity of a fixing member in the cross-sectional view of FIG. 2.

When the respective layers are viewed from the lamination direction, the respective formation regions of the positive-electrode current collector layer 3, the negative-electrode active material layer 5, and the positive-electrode active material layer 7 are approximately the same. The respective end portions of the positive-electrode current collector layer 3, the negative-electrode active material layer 5, and the positive-electrode active material layer 7 are aligned. The formation region of the negative-electrode current collector layer 4 is wider than the respective formation regions of the positive-electrode current collector layer 3, the negative-electrode active material layer 5, and the positive-electrode active material layer 7. Accordingly, the end portions of the negative-electrode current collector layer 4 extends outward further than the respective end portions of the positive-electrode current collector layer 3, the negative-electrode active material layer 5, and the positive-electrode active material layer 7. This portion extending outward forms a current-collector extension portion 4b as illustrated in FIG. 3.

The solid electrolyte layer 6 covers the overall negative-electrode current collector layer 4 with both surfaces where the negative-electrode active material layers 5 are formed. The solid electrolyte layer 6 includes a lamination portion 6a, a first electrolyte extension portion 6b, and a second electrolyte extension portion 6c. The lamination portion 6a covers the surface of the negative-electrode active material layer 5. The first electrolyte extension portion 6b covers the end surface of the negative-electrode active material layer 5. The second electrolyte extension portion 6c covers a base end portion 4c of the current-collector extension portion 4b. Additionally, a portion of the negative-electrode current collector layer 4 exposed from the second electrolyte extension portion 6c is referred to as a distal end portion 4d of the current-collector extension portion 4b below.

The distal end portion 4d of the negative-electrode current collector layer 4 and the second electrolyte extension portion 6c of the solid electrolyte layer 6 are fixed together by a fixing member 10. The fixing member 10 has a stepped shape that sandwiches the distal end portion 4d of the negative-electrode current collector layer 4 and the second electrolyte extension portion 6c of the solid electrolyte layer 6, and is constituted of an insulating material such as PET. The fixing member 10 includes an electrolyte covering portion 10a, a current-collector covering portion 10b, and a distal-end covering portion 10d. The electrolyte covering portion 10a covers the front and back surfaces of the second electrolyte extension portion 6c. The current-collector covering portion 10b is positioned outside of the electrolyte covering portion 10a, and covers the front and back surfaces of the distal end portion 4d of the current-collector extension portion 4b. The distal-end covering portion 10d extends outward further than the current-collector covering portion 10b, and covers an end surface 4e of the distal end portion 4d.

Additionally, the electrolyte covering portion 10a of the fixing member 10 covers the second electrolyte extension portion 6c of the solid electrolyte layer 6. The current-collector covering portion 10b of the fixing member 10 integrally covers the overall distal end portion 4d of the negative-electrode current collector layer 4. Between the inner surface of the current-collector covering portion 10b and the outer surface of the distal end portion 4d, a fixing portion 10c is disposed. This fixing portion 10c fixes the current-collector covering portion 10b and the distal end portion 4d together, for example, with adhesion or similar method. Thus, the fixing portion 10c fixes the fixing member 10 and the negative-electrode current collector layer 4 together, and the second electrolyte extension portion 6c of the solid electrolyte layer 6 are covered with the electrolyte covering portion 10a of the fixing member 10. Accordingly, the second electrolyte extension portion 6c of the solid electrolyte layer 6 is pushed by the electrolyte covering portion 10a of the fixing member 10 in the removal of air from the inside of the exterior member 2. Thus, the solid electrolyte layer 6 is strongly fixed to the fixing member 10. Accordingly, the fixing member 10 contributes to prevent positional shift of the solid electrolyte layer 6.

As described above, the electrode body 1 includes the electrolyte extension portions 6b and 6c, the current-collector extension portion 4b, and the fixing member 10. In the electrolyte extension portions 6b and 6c, the solid electrolyte layer 6 integrally covers the end surface of the negative-electrode active material layer 5 and the base end portion 4c of the current-collector extension portion 4b. In the current-collector extension portion 4b, the negative-electrode current collector layer 4 extends outward further than the negative-electrode active material layer 5. The fixing member 10 covers the front and back surfaces of the distal end portion 4d exposed from the second electrolyte extension portion 6c in the current-collector extension portion 4b. Thus, the second electrolyte extension portion 6c is covered with the fixing member 10 so as to form the laminated structure. The second electrolyte extension portion 6c is fixed outside of the layer (in the portion that is not sandwiched by the positive-electrode current collector layer 3, the negative-electrode current collector layer 4, the negative-electrode active material layer 5, the solid electrolyte layer 6, or the positive-electrode active material layer 7). This allows appropriate positioning while suppressing the increase in thickness.

The fixing member 10 covers the overall distal end portion 4d of the current-collector extension portion 4b. This can achieve a high fixing force in the fixing member 10.

As illustrated in FIG. 3, in the fixing member 10, in the lamination direction (the up and down directions in the drawing), the distance from the surface of the solid electrolyte layer 6 to the electrolyte covering portion 10a is designed to be a distance A1, the distance from the surface of the solid electrolyte layer 6 to the center position of the distal-end covering portion 10d in the lamination direction is designed to be a distance A2, and the distance A1 is designed to be shorter than the distance A2. Thus, the fixing member 10 become thinner toward one end of the fixing member. This can reliably avoid a situation in which the fixing member 10 hinders when the respective layers are stacked in the laminated body 1a.

Further, the negative-electrode current collector layer 4 and the negative-electrode active material layer 5 are covered with the solid electrolyte layer 6 and the fixing member 10. Therefore, the negative-electrode current collector layer 4 and the negative-electrode active material layer 5 do not have contact with the positive-electrode current collector layer 3 and the positive-electrode active material layer 7. Additionally, even if burr is generated in any of the positive-electrode current collector layer 3, the negative-electrode current collector layer 4, the negative-electrode active material layer 5, and the positive-electrode active material layer 7, the negative-electrode current collector layer 4 and the negative-electrode active material layer 5 are protected as described above. This can reliably avoid a situation in which a short circuit occurs.

While the embodiment of the electrode body according to the present invention has been described above, the electrode body according to the present invention is not limited to the above-described embodiments. The electrode body according to the present invention may be modified from the electrode body according to the embodiment without departing the gist of the present invention as defined in the appended claims.

For example, while in the above-described embodiment the example where the negative-electrode current collector layer 4 and the negative-electrode active material layer 5 are covered with the solid electrolyte layer 6 and the fixing member 10 has been described, the positive-electrode current collector layer 3 and the positive-electrode active material layer 7 may be covered with the solid electrolyte layer 6 and the fixing member 10 as described above. Additionally, in the laminated structure in the electrode body 1, the lamination order is not limited to the above-described order. In the lamination order, for example, all the positive electrodes and all the negative electrodes may be switched in positions.

Figure 4:
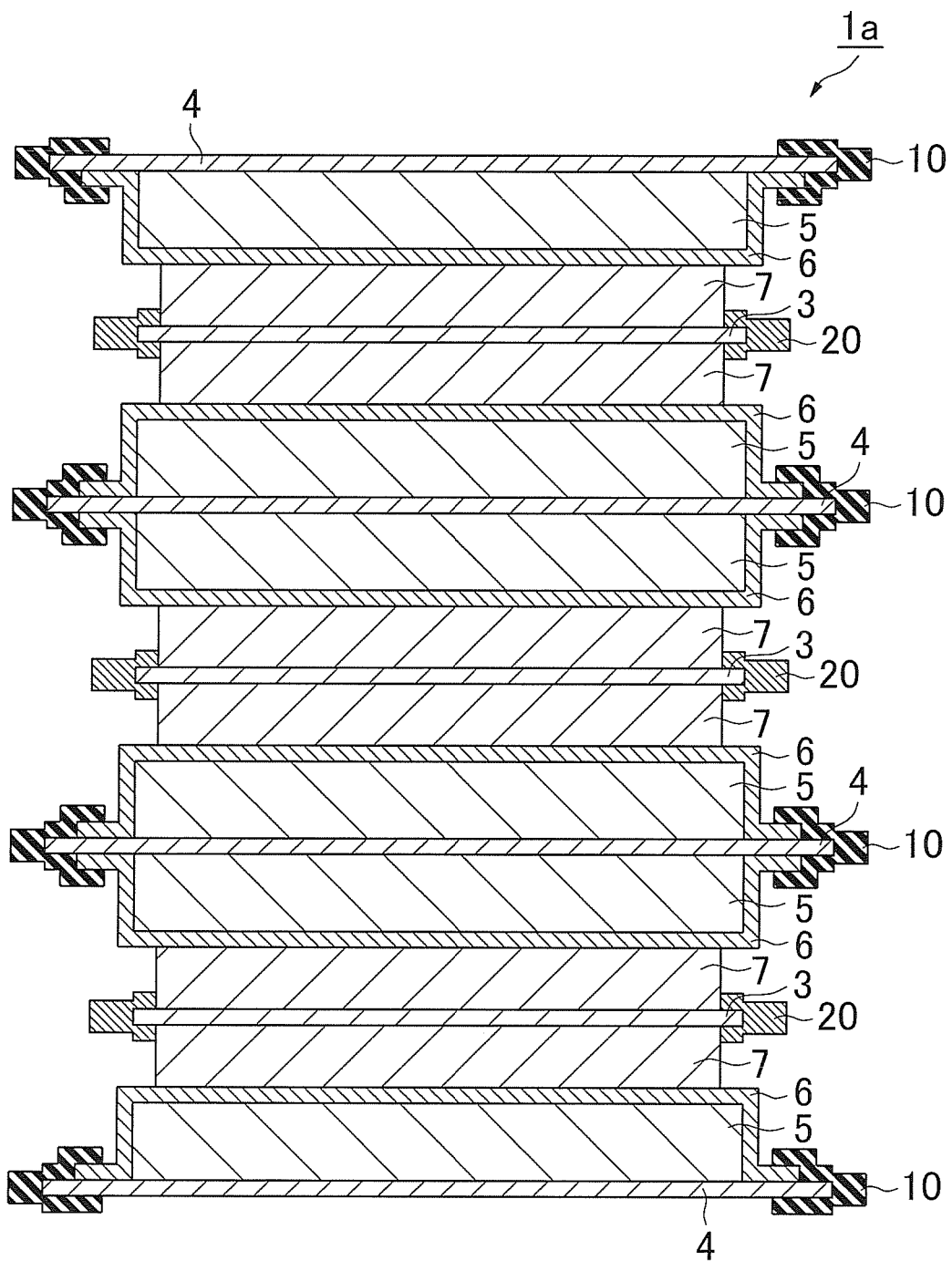
FIG. 4 is a cross-sectional view of an electrode body according to a modification corresponding to FIG. 2.

As illustrated in FIG. 4, a fixing member 20 that fixes a part of the end surface outside of the positive-electrode active material layer 7 and the current-collector extension portion of the positive-electrode current collector layer 3 together may be further provided. Thus, fixing the respective current-collector extension portions of the positive-electrode current collector layer 3 and the negative-electrode current collector layer 4 using the fixing members 10 and 20 achieves a stronger laminated structure and allows more reliable positioning.

While in the above-described embodiment the fixing member 10 covers the overall distal end portion 4d of the current-collector extension portion 4b, the fixing member 10 may cover only the front and back surfaces of the distal end portion 4d. Additionally, the example where the fixing member 10 has the stepped shape that includes the electrolyte covering portion 10a, the current-collector covering portion 10b, and the distal-end covering portion 10d has been described. However, the shape or the structure of the fixing member 10 is not limited to the above-described example, and can be changed as necessary.

What is claimed is:

1. An electrode body, comprising:
a laminated body that includes a positive electrode layer, a negative electrode layer, a positive-electrode current collector layer, a negative-electrode current collector layer, and a solid electrolyte layer,
the positive-electrode current collector layer or the negative-electrode current collector layer includes a current-collector extension portion that extends outward further than the positive electrode layer or the negative electrode layer,
the solid electrolyte layer includes a first electrolyte extension portion and a second electrolyte extension portion that integrally covers an end surface of the positive electrode layer or the negative electrode layer and a base end portion of the current-collector extension portion, respectively; and
an insulating fixing member that includes a current-collector covering portion and a fixing portion,
the current-collector covering portion covers at least front and back surfaces of a distal end portion of the current-collector extension portion, the distal end portion being exposed from the electrolyte extension portion,
the fixing portion is disposed between an inner surface of the current-collector covering portion of the insulating fixing member and an outer surface of the distal end portion of the current-collector extension portion, the fixing portion fixes the insulating fixing member to the distal end portion of the current-collector extension portion,
wherein the insulating fixing member covers only the second electrolyte extension portion out of first electrolyte extension portion and the second electrolyte extension portion.

2. The electrode body according to claim 1, wherein the fixing member covers an overall distal end portion of the current-collector extension portion.

3. The electrode body according to claim 1, wherein the fixing member becomes thinner toward one end of the fixing member.

* * * * *